United States Patent
Pasquet et al.

(10) Patent No.: US 9,890,766 B2
(45) Date of Patent: Feb. 13, 2018

(54) PITCH DRIVE SYSTEM

(71) Applicant: ALSTOM RENOVABLES ESPAÑA, S.L., Barcelona (ES)

(72) Inventors: Pierre Pasquet, Alella (ES); Javier Checa Caballero, Barcelona (ES); Daniel García I Erill, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 529 days.

(21) Appl. No.: 14/216,924

(22) Filed: Mar. 17, 2014

(65) Prior Publication Data

US 2014/0286775 A1    Sep. 25, 2014

(30) Foreign Application Priority Data

Mar. 25, 2013 (EP) .................................... 13382110

(51) Int. Cl.
  *F03D 7/02*     (2006.01)
  *F03D 7/04*     (2006.01)
  *F16H 57/04*    (2010.01)
  *F03D 80/70*    (2016.01)

(52) U.S. Cl.
  CPC ............. *F03D 7/0224* (2013.01); *F03D 7/04* (2013.01); *F03D 80/70* (2016.05); *F16H 57/0431* (2013.01); *F05B 2260/98* (2013.01); *Y02E 10/722* (2013.01)

(58) Field of Classification Search
  CPC .......... F03D 7/0224; F03D 7/04; F03D 80/70; F16H 57/0431
  USPC ....................................................... 184/6.12
  See application file for complete search history.

(56) References Cited

U.S. PATENT DOCUMENTS

| | | | | |
|---|---|---|---|---|
| 3,424,022 A | * | 1/1969 | Greenberg | F16H 57/0431 74/409 |
| 3,854,553 A | * | 12/1974 | Miller | E02F 9/121 184/6.12 |
| 5,622,239 A | * | 4/1997 | Orlitzky | F16H 57/0463 184/39 |
| 7,244,097 B2 | * | 7/2007 | Hinz | F03D 7/0224 415/122.1 |
| 2005/0051387 A1 | * | 3/2005 | Flamang | F16H 57/043 184/6.12 |
| 2007/0081896 A1 | * | 4/2007 | Mollhagen | F03D 80/70 416/98 |

(Continued)

FOREIGN PATENT DOCUMENTS

| | | |
|---|---|---|
| DE | 20 2005 014699 | 12/2005 |
| DE | 10 2006 013865 | 9/2007 |

(Continued)

OTHER PUBLICATIONS

European Search Report for EP 13382110, dated Sep. 10, 2013, 5 pgs.

*Primary Examiner* — Michael A Riegelman
(74) *Attorney, Agent, or Firm* — Dority & Manning, P.A.

(57) ABSTRACT

Pitch drive system for a wind turbine comprising a motor, a drive pinion operationally connected with the motor and a gear arranged to mesh with the drive pinion, wherein a first plate is provided on one side of the drive pinion, the first plate comprising one or more channels adapted to provide a lubricant to a tooth of the drive pinion that is in meshing engagement with teeth of the gear. The disclosure further relates to a wind turbine rotor.

16 Claims, 9 Drawing Sheets

(56) References Cited

U.S. PATENT DOCUMENTS

| | | | | |
|---|---|---|---|---|
| 2008/0276743 | A1* | 11/2008 | Salmela | F16H 57/0431 74/467 |
| 2013/0192930 | A1* | 8/2013 | Segovia | F03D 11/0008 184/14 |
| 2015/0016998 | A1* | 1/2015 | Pasquet | F03D 1/001 416/147 |
| 2015/0114756 | A1* | 4/2015 | Xu | F03D 80/70 184/4 |
| 2015/0114758 | A1* | 4/2015 | Casals Terre | F16H 55/17 184/6.12 |

FOREIGN PATENT DOCUMENTS

| | | |
|---|---|---|
| DE | 20 2011 000275 | 5/2011 |
| EP | 1816346 | 8/2007 |
| FR | 2 250 052 A1 | 5/1975 |
| SU | 530980 | 10/1976 |
| WO | WO 2010/045914 | 4/2010 |

\* cited by examiner

PITCH DRIVE SYSTEM

This application claims the benefit of European Patent Application 13382110.8 filed on Mar. 25, 2013, the entire contents of which are hereby incorporated by reference for all purposes.

The present disclosure relates to pitch drive systems for wind turbine rotors. The disclosure further relates to wind turbines comprising such rotors.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

An important auxiliary drive system generally provided on wind turbines is the pitch system.

Pitch systems may be employed for adapting the position of wind turbine blades to varying wind conditions. In this respect, it is known to rotate the position of a wind turbine blade along its longitudinal axis in such a way that it generates less lift (and drag) when the wind speed increases. In this way, even though the wind speed increases, the torque transmitted by the rotor to the generator remains substantially the same. It is furthermore also known to use pitching for rotating wind turbine blades towards their stall position (so as to reduce the lift on the blades) when the wind speed increases. These wind turbines are sometimes referred to as "active-stall" wind turbines. Pitching may furthermore also be used for rotation of the blades towards their vane position, when a turbine is temporarily stopped or taken out of operation for e.g. maintenance.

Pitch systems generally comprise an electric or hydraulic motor which, through the use of reduction gearing (sometimes referred to as a "reductor", or as a "reduction gear") drives an actuating gear. Said actuating gear (pinion) is generally arranged to mesh with an annular gear provided on the wind turbine blade to set the wind turbine blade into rotation. It is also possible however, to provide the annular gear on the hub, whereas the electric motor and actuator may be mounted on the blade. Other actuating mechanisms, e.g. involving hydraulic actuators, are also known.

It is further known to provide an individual pitch system (comprising a separate motor and a separate control) for each individual wind turbine blade of a rotor. Also, it is known to provide a common pitch system wherein the pitch angle of the blades is the same for all blades on a rotor. Such a common pitch system may comprise a single motor or may comprise a plurality of motors, one for each blade.

A control strategy of a pitch system that is often employed in variable speed wind turbines is to maintain the blade in a predefined "below rated pitch position", i.e. a default pitch position, at wind speeds equal to or below nominal wind speed (for example, approximately 4 m/s-15 m/s). Said default pitch position may generally be close to a 0° pitch angle. The exact pitch angle in or below nominal wind speed conditions depends however on the complete design of the wind turbine. Above the nominal wind speed (for example from approximately 15 m/s-25 m/s), the blades are rotated to maintain the aerodynamic torque delivered by the rotor substantially constant. When the wind turbine is not operating, the blades may assume a vane position (e.g. at or around 90° pitch angle) to minimize the loads on the blades.

During most of the wind turbine's life, a blade may however be in the same pitch position which is the default position at or below nominal wind speed. The nominal wind speed, cut-in wind speed and cut-out wind speed may of course vary depending on the wind turbine design.

During operation of the wind turbine, forces may be acting on the blades that result in a constantly varying torque around the blade's longitudinal axis. These forces may include the aerodynamic torque around the longitudinal axis of the blade. Furthermore, since the blade's centre of mass is usually not located exactly on its rotating axis, the weight of the blade may exercise an additional torque around the blade's longitudinal axis. Both these forces are non-constant, largely cyclical and tend to rotate the blade out of the position determined by the pitch control system.

When pitch systems involving gearing are used, the varying torque may result in flanks of the teeth of the actuating gear (pinion) and annular gear repeatedly touching each other. Such repetitive contact between teeth may remove thin metallic particles, and may create a tooth print in the contacting flanks of the gear and the pinion. This repetitive contact may thus lead to fretting corrosion and premature wear. Since the pitch position at or below nominal wind speed i.e. the below rated pitch position is the prevailing position for most wind turbines, the contact between the teeth and its consequences is usually concentrated on the same teeth.

Document WO2010045914 discloses a rotor for a wind energy plant, comprising a hub, at least one rotor blade fixed to the hub and a rotor blade adjuster device comprising a pinion, wherein the pinion is arranged to rotate the rotor blade by engagement with a crown gear arranged on the hub or the rotor blade. The rotor further comprises pitch guide means for displacing the rotor blade adjuster device between two positions, in which cooperation between the pinion and crown gear is possible. The goal of providing more than one position of cooperation between pinion and crown gear is for replacement of the crown gear to be delayed.

It is also known to provide an automatic lubrication system in an attempt to try and at least in part prevent fretting corrosion. Some of these systems provide a lubrication pinion arranged close to the drive pinion. For example, document U.S. Pat. No. 7,244,097 provide such systems. However such designs are quite cumbersome and costly. Document EP1816346 describes a lubricating device having a lubricating passage passing through the drive pinion or through a slewing ring. Such a passage may weaken the drive pinion or the slewing ring in which it is bored. Document DE202005014699 describes a lubricating device comprising lubricant spray nozzles oriented towards the area on which the lubricant is desired. However, in such a system the lubricant can be spread more than desirable and thus contaminate the area around the pitch system.

There still exists a need for wind turbine pitch systems that can reduce the problem of fretting corrosion between contacting teeth. It is an object of the present invention to at least partially fulfil this need.

SUMMARY

In a first aspect a wind turbine pitch drive system is provided. The pitch drive system comprises a motor, a drive pinion operationally connected with the motor and a gear arranged to mesh with the drive pinion, wherein a first plate is provided on one side of the drive pinion, the first plate comprising one or more channels adapted to provide a lubricant to a tooth of the drive pinion that is in meshing engagement with teeth of the gear.

According to this aspect, the teeth of the drive pinion that are meshing with teeth of the gear receive a lubricant while they are meshing, i.e. when their flanks can be touching each other due to the varying torque produced by the weight and the torsional forces of the rotor blade. Thus the lubricant is received when it is (most) needed. The engagement is provided with a lubricant and fretting corrosion and premature wear of the teeth of the gear and the pinion can thus be reduced or at least delayed. This way, the life of the gear and the drive pinion may be extended.

In some embodiments, the channels may be adapted to provide lubricant to at least one flank of the tooth of the drive pinion that is in meshing engagement with teeth of the gear. This ensures the provision of lubricant at the area of the tooth that is needed or what is the same where it is needed.

In some embodiments, the first plate may be a circular plate concentrically mounted on one side of the drive pinion and may have a radius substantially equal to or larger than that of the drive pinion. With such a configuration the channels provided in the plate can easily reach the tooth of the drive pinion that is in meshing engagement with teeth of the gear and it does not represent hindrance when mounting the plate one side of the drive pinion.

In some embodiments, the channels may be substantially T-shaped such that a lubricant flowing through a channel can reach both flanks of the tooth of the drive pinion. The two flanks of the drive pinion tooth can thus receive lubricant at the same time and with each engagement with teeth of the gear.

In some embodiments, the lubricant may be grease. Because of its density, grease may be more easily confined with simplified and cheap retention devices and lubrication may last longer.

In some of these embodiments, the system may further comprise a second plate arranged on the other side of the drive pinion, opposite to the first plate; the second plate may span at least the meshing engagement of the drive pinion with the gear such that a lubricant delivered by the channels can be retained by the second plate. The second plate can constitute a rather simple and substantially low cost retention system.

Any lubricant may be used in accordance with circumstances. In some examples, a lubricating oil may be used. Depending on which kind of lubricant is used, it may be desirable to provide for a retention system.

In some embodiments, the second plate may comprise an outlet in order to direct the outflow for example towards a deposit. As the quality of the lubricant is of utmost importance in order to prevent failures, the old lubricant needs to be removed on a regular basis in order to maintain adequate lubrication properties.

In another aspect, a wind turbine rotor is provided comprising a hub, a plurality of blades and one or more pitch drive systems substantially as hereinbefore described.

In some embodiments, the rotor may further comprise a valve and a control system for regulating the provision of lubricant designed such that when the blade is substantially in or near below rated pitch position lubricant is delivered to the channels.

And in yet another aspect a wind turbine is provided comprising a wind turbine rotor substantially as hereinbefore described.

Additional objects, advantages and features of embodiments of the present invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

All through the figures the same reference numbers will be used to denote the same or very similar elements.

Figure 1:
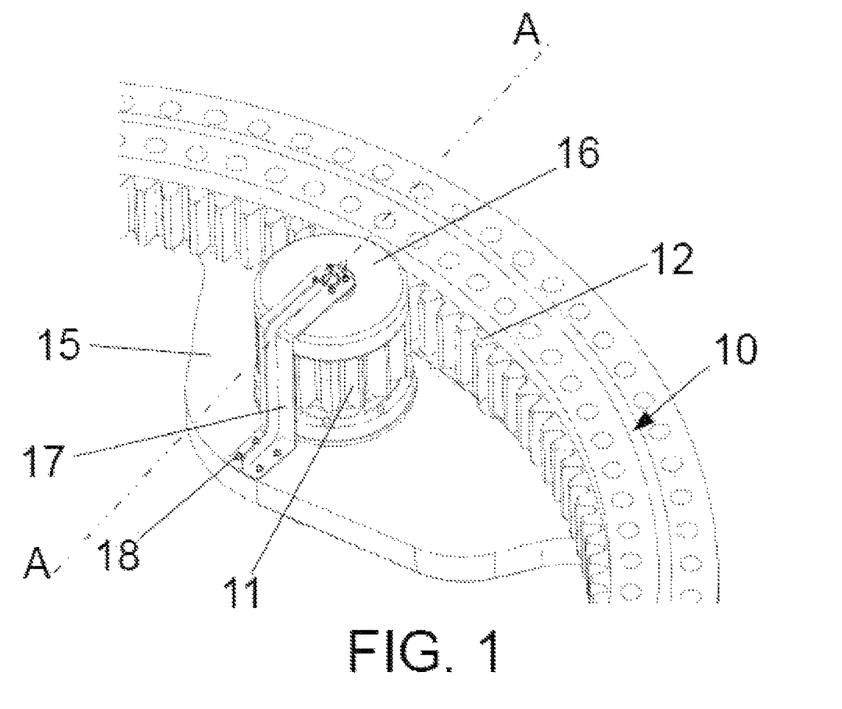
FIG. 1 shows a perspective view of a partial pitch drive system for a wind turbine according to an embodiment.
Figure 8:
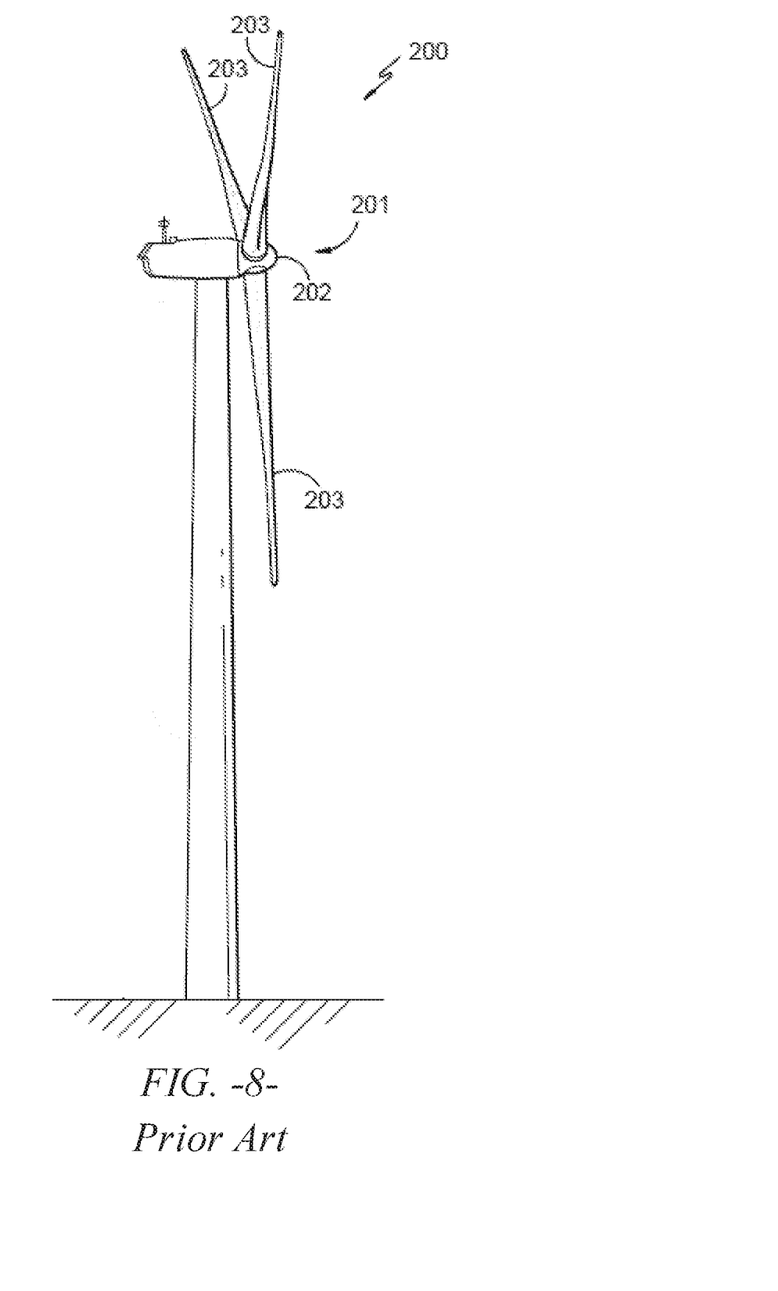
FIG. 8 shows a prior art wind turbine.
Figure 9:
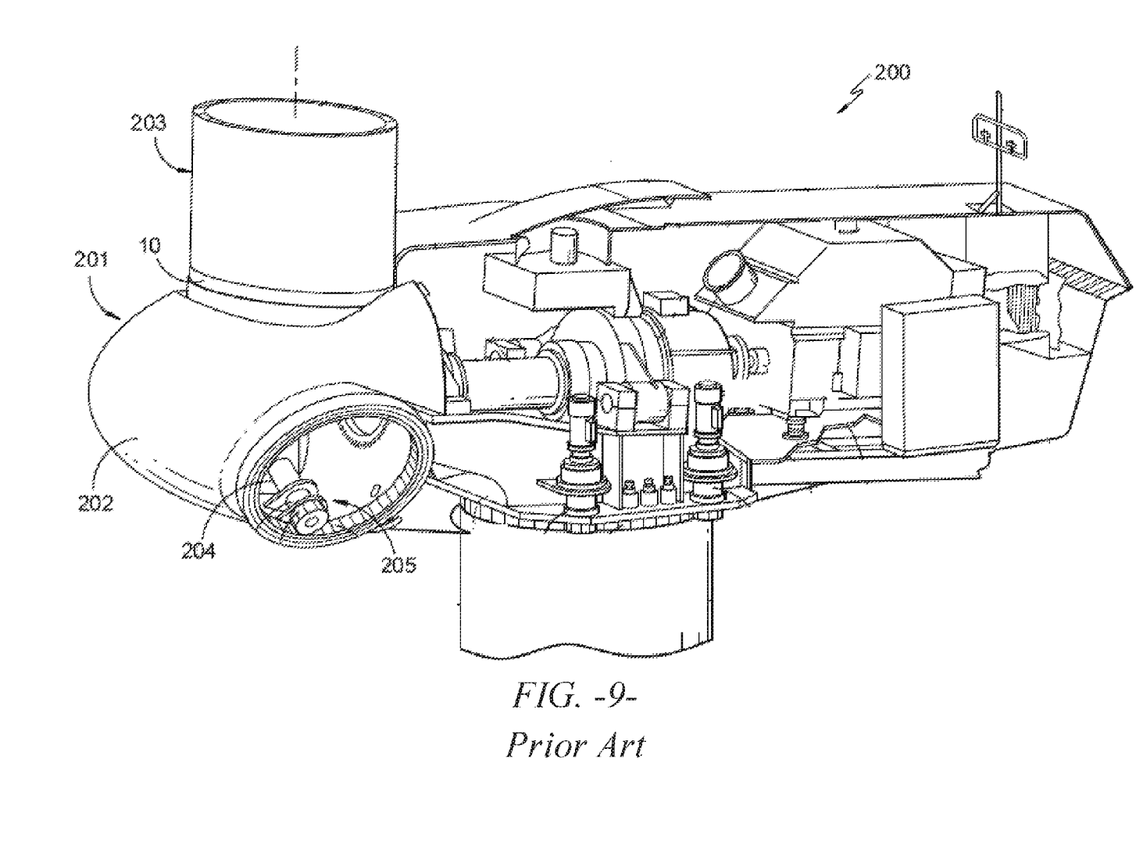
FIG. 9 shows a perspective view of a partial prior art pitch drive system of a wind turbine.

FIG. 1 shows part of a pitch drive system (depicted as system 205 in FIG. 9) for a wind turbine 200 (FIG. 8) according to an embodiment. The pitch drive system may comprise a pitch bearing 10, a motor 204 FIG. 9) a drive pinion 11 operationally connected with the motor and a gear 12 arranged to mesh with the drive pinion 11.

The gear 12 may typically be an annular gear or an annular gear segment. The gear could be fixed to e.g. a bearing ring, a portion of the blade 203 or a portion of the hub 202 of a rotor 201.

Figure 4:
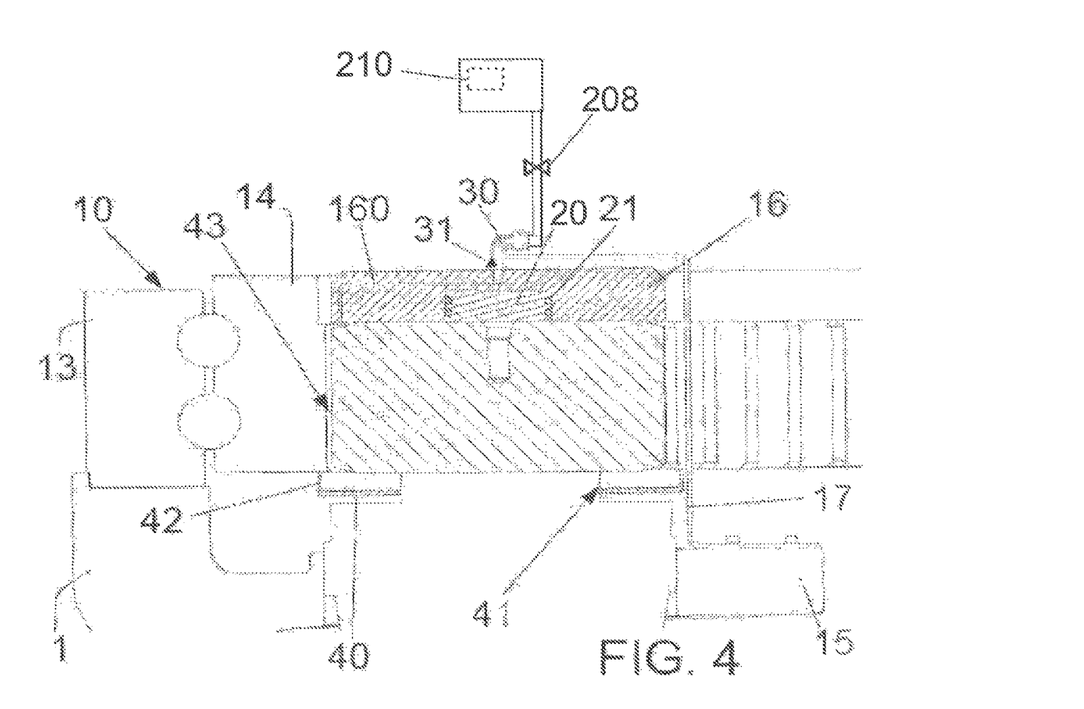
FIG. 4 shows a cross-sectional view along line A-A of FIG. 1.

As shown in FIG. 4, the pitch bearing 10 may comprise an outer bearing ring 13 connected with the hub 1 and an inner bearing ring 14 connected with a blade (not shown). It should be noted, that in other implementations the blades could be attached either at the outer or at the inner bearing ring and the hub would be attached to the other of the outer or inner bearing ring.

The pitch drive system may further comprise a gearbox comprising reduction gearing (sometimes referred to as a "reductor" or a "reducer") arranged between the motor and the drive pinion. A part of the pitch drive system such as the gearbox or the motor may be supported by a flange 15 of the hub. In some embodiments, the flange may form an integral piece with the hub. In others it may be a separate piece fixed to the hub by welding or by fastening means such as screws, bolts or similar.

In the example of FIG. 1, a first plate 16 may be provided on one side of the drive pinion 11, opposite the flange 15 on which the pitch drive system may be mounted. The first plate 16 may be fixedly attached to the flange 15 by a bracket 17 which may be substantially Z-shaped and may be fixed with screws or bolts 18 to the flange 15 and to the first plate 16.

Figure 2:
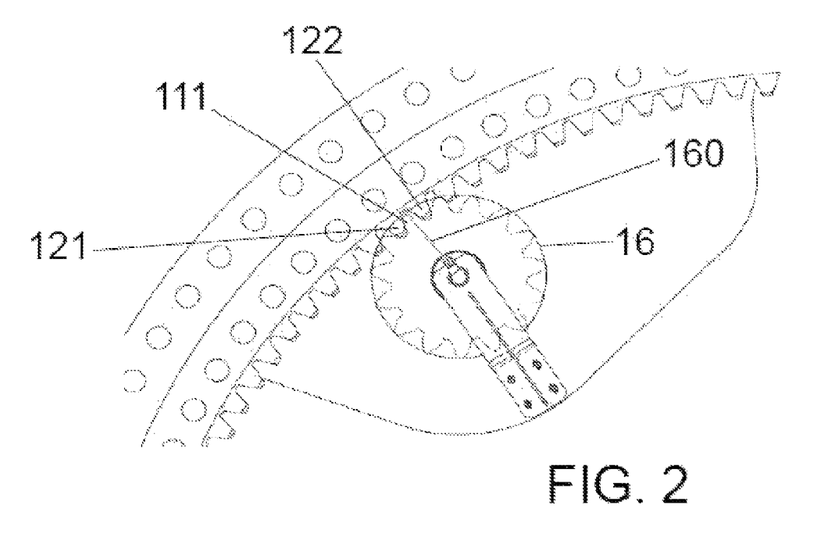
FIG. 2 shows a partial top view of FIG. 1.

FIG. 2 shows a partial top view of FIG. 1 wherein the first plate 16 has been made substantially transparent in order to show that at least one channel 160 may be provided in the first plate 16. The channel 160 may be adapted to provide lubricant to a tooth 111 of the drive pinion 11 that in turn may be in meshing engagement with teeth 121, 122 of the gear 12. A radius of the first plate 16 may be substantially equal to that of the drive pinion 11. This way, the channel 160 can reach at least one flank of the tooth 111.

In one example, the lubricant can reach a trailing face of a drive pinion tooth that may be in contact with the respective leading face of the tooth behind it on the driven (annular) gear. In another example, the lubricant can reach a leading face of the drive pinion tooth that may be contacting the respective trailing face of the tooth ahead it on the driven gear. In yet another example, the lubricant may reach both, trailing and leading faces, of the drive pinion tooth. In alternative embodiments, the radius of the first plate may be larger than that of the drive pinion.

Figure 3:
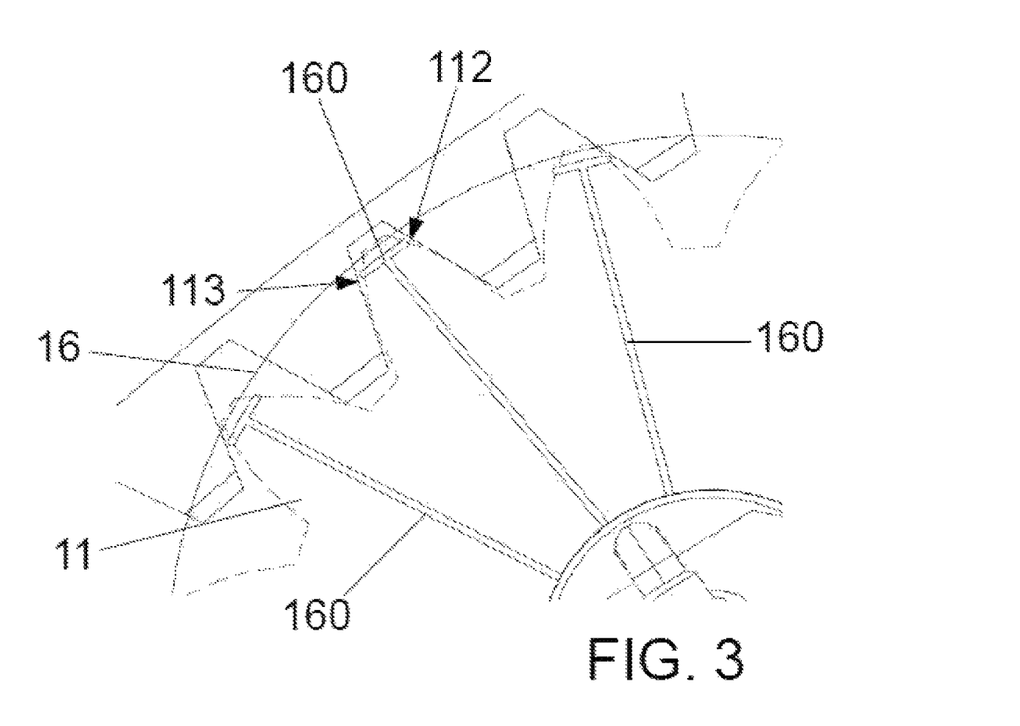
FIG. 3 is a partial top view according to a different embodiment.

FIG. 3 shows a partial top view according to a different embodiment in which the first plate 16 has also been shown in a substantially transparent manner in order to show that three channels 160 may be provided in the first plate 16. The channels 160 may be substantially T-shaped in order to provide lubricant to both flanks of the teeth 112, 113 of the drive pinion 11 i.e. the trailing and leading faces respectively. The channels may extend in a substantially radial manner.

It should be understood that other number of channels may also be possible. The channels may be machined in a first plate and the plate may be made of metal or plastic.

FIG. 4 shows a cross-sectional view along line A-A of FIG. 1. According to FIG. 4, the first plate 16 may be rotatably mounted with respect to the drive pinion 11 by for example a cylindrical piece 20 that may be fixed to the drive pinion 11 and provided with one or more bearings 21. The first plate 16 may thus rotate about the cylindrical piece 20. And, as explained in connection with FIG. 1, the first plate 16 may be fixedly attached to the flange 15 by bracket 17. In alternative embodiments, other types of rotary joints may be foreseen.

Furthermore, FIG. 4 shows a lubricant supply 30 that may have a single orifice 31 adapted to be in fluid communication with the channel 160 provided in the first plate 16. It should be understood that in those cases in which more than one channel is provided the orifice would be adapted to provide fluid communication to all the channels. Depending on circumstances, a valve 208 and a control system 210 may further be provided for regulating the provision of lubricant to the different channels.

In this example, as the drive pinion rotates, i.e. as the wind turbine blade assumes a different blade position, the first plate 16 does not move. The single channel 160 or the plurality of channels will thus continue to deliver lubricant to the same point of the (annular) gear, namely the point at which the drive pinion meshes with the gear.

FIG. 4 further shows a second plate 40 that may be provided on the other side of the drive pinion 11, opposite to the first plate 16. The second plate 40 may span at least the meshing engagement (see arrow 43) of the drive pinion 11 with the gear 12. Furthermore, the second plate 40 may be fixedly mounted for example to a structure 41 supporting the drive pinion shaft (not shown) and may have lateral extensions 42 protruding towards the drive pinion 11. This way, it may act as a retention system for the lubricant delivered by the channel 160. The second plate 40 may be especially suitable in those cases in which the lubricant is grease instead of e.g. an oil.

In some embodiments, the second plate may comprise an outlet (not shown) towards a deposit so that the old lubricant can be removed on a regular basis.

Figure 5:
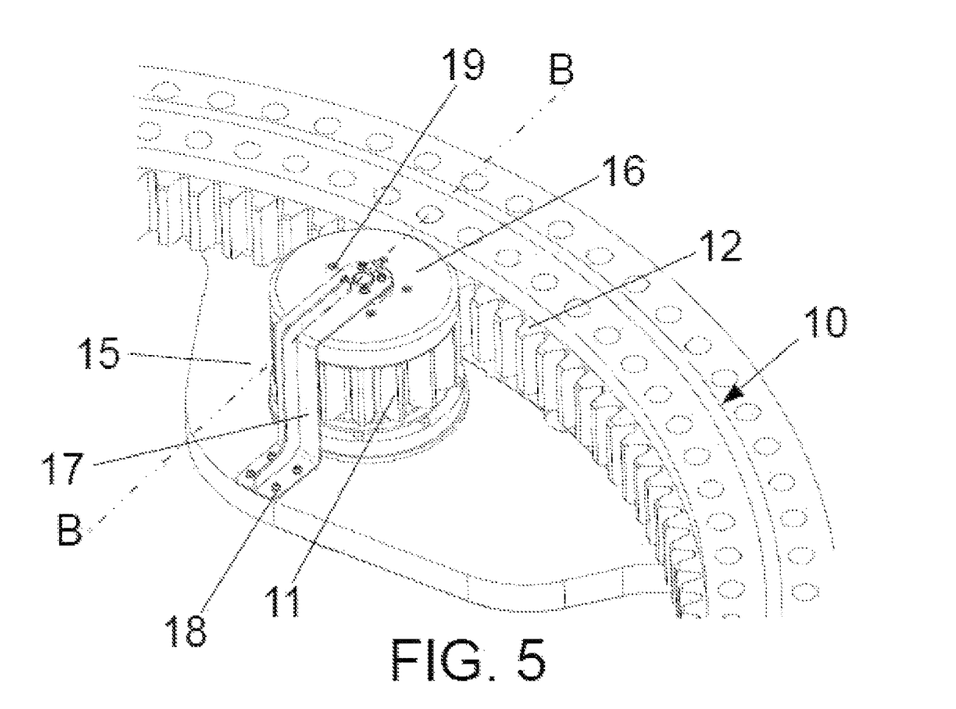
FIG. 5 shows a perspective view of a partial pitch drive system for a wind turbine according to a further embodiment.

FIG. 5 shows a perspective view of a partial pitch drive system for a wind turbine according to a further embodiment. FIG. 5 differs from FIG. 1 in that the first plate 16 is fixedly mounted to the drive pinion 11 by means for example of screws or bolts 19. This means that when the drive pinion rotates for pitching a blade, the first plate 16 rotates with it.

Figure 6:
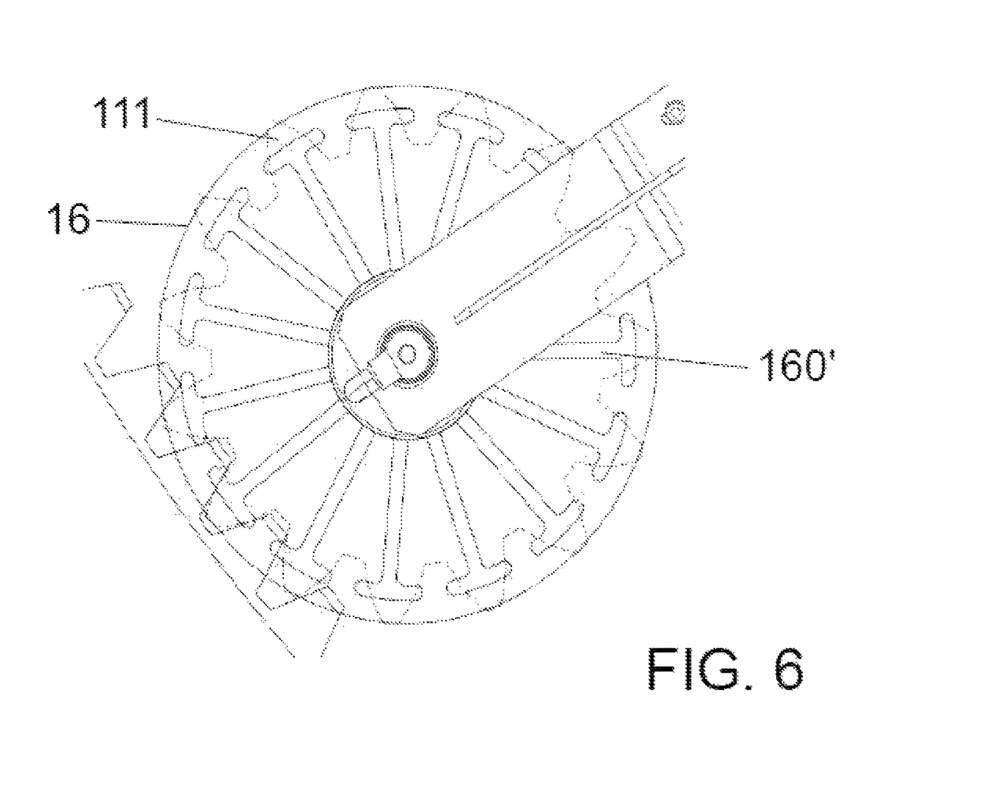
FIG. 6 shows a partial top view of FIG. 5.

FIG. 6 shows a partial top view of FIG. 5 wherein the first plate 16 has been made substantially transparent in order to show that a plurality of channels 160' may be provided in the first plate 16. Each channel 160' may be designed to provide lubricant to a tooth 111' of the drive pinion 11. Each channel 160' may be substantially T-shaped in order to provide lubricant to both flanks of the teeth of the drive pinion 11 i.e. the trailing and leading faces respectively as it was explained before in connection with FIG. 3.

Figure 7:
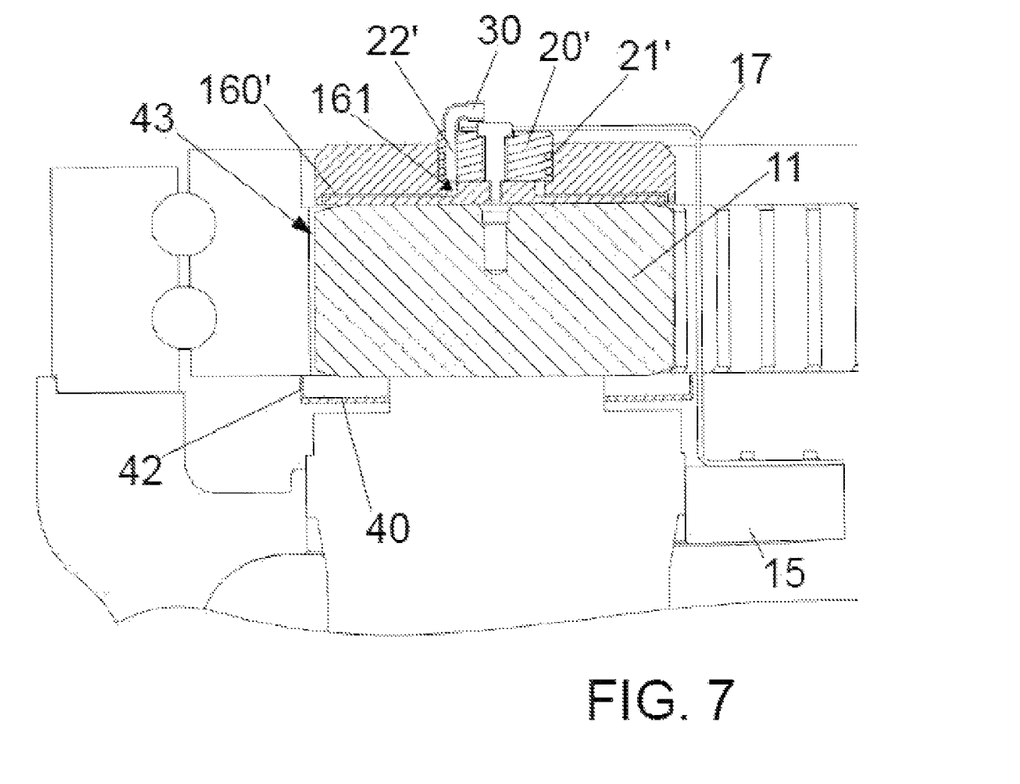
FIG. 7 shows a cross sectional along line B-B view of FIG. 5.

FIG. 7 shows a cross-sectional view along line B-B of FIG. 5. FIG. 7 differs from FIG. 4 in that the cylindrical piece 20' may be fixed to the bracket 17 and may be provided with bearings 21' in order to allow rotation of the first plate 16. As explained in connection with FIG. 5 the first plate 16 may be fixed to the drive pinion 11 and rotates together with it. In alternative embodiments, other types of rotary joints may also be foreseen.

In this case, the cylindrical piece 20' may be provided with a single orifice or conduct 22' that may be adapted to be in fluid communication selectively with each of the channels 160' of the first plate 16. This way, as the plate rotates together with the drive pinion 11 each tooth of the drive pinion that consecutively meshes with the annular gear can receive lubricant. In an alternative arrangement, three orifices may be provided that are selectively in communication with the tooth meshing with the annular gear, the tooth "forward" of that and the tooth "backwards" of that in a manner as was illustrated with reference to FIG. 3.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A pitch drive system for a wind turbine comprising a motor, a drive pinion operationally connected with the motor and a gear arranged to mesh with the drive pinion, wherein a first plate is provided on one side of the drive pinion, the first plate comprising one or more channels adapted to provide a lubricant to a tooth of the drive pinion that is in meshing engagement with teeth of the gear; and wherein the first plate is rotatably mounted with respect to the drive pinion.

2. The pitch drive system of claim 1, wherein the channel is adapted to provide lubricant to at least one flank of the tooth of the drive pinion that is in meshing engagement with teeth of the gear.

3. The pitch drive system of claim 1, wherein the first plate is a circular plate concentrically mounted on one side of the drive pinion, the circular plate having a radius that is substantially equal to or larger than that of the drive pinion.

4. The pitch drive system of claim 1, wherein the channels are substantially T-shaped such that a lubricant flowing through a channel reaches both flanks of the tooth of the drive pinion.

5. The pitch drive system of claim 1, further comprising a lubricant supply having an orifice, the orifice adapted to be in fluid communication with the channel of the first plate.

6. The pitch drive system of claim 5, wherein the lubricant supply comprises a cylindrical piece arranged on a side of the first plate that is opposite to the drive pinion, the orifices being provided in the cylindrical piece.

7. The pitch drive system of claim 6, wherein the cylindrical piece is rotatably arranged with respect to the first plate and comprises an orifice adapted to selectively be in fluid communication with each channel of the first plate.

8. The pitch drive system of claim 1, wherein the lubricant is grease.

9. The pitch drive system of claim 8, further comprising a second plate arranged on the other side of the drive pinion, opposite to the first plate, the second plate spanning at least the meshing engagement of the drive pinion with the gear such that a lubricant delivered by the channel can be retained by the second plate.

10. The pitch drive system of claim 9, wherein the second plate comprises an outlet.

11. A wind turbine rotor comprising a hub, a plurality of blades, and one or more pitch drive systems according to claim 1.

12. The wind turbine rotor of claim 11, further comprising a valve and a control system for regulating the provision of lubricant to the channel.

13. A wind turbine comprising a wind turbine rotor according to claim 11.

14. A wind turbine comprising a wind turbine rotor comprising a hub, a plurality of blades, and a pitch drive system, the pitch drive system further comprising:
a motor, a drive pinion operationally connected with the motor and a gear arranged to mesh with the drive pinion, wherein a first plate is provided on one side of the drive pinion, the first plate comprising one or more channels adapted to provide a lubricant to a tooth of the drive pinion that is in meshing engagement with teeth of the gear; and wherein the first plate is rotatably mounted with respect to the drive pinion.

15. The wind turbine of claim 14, wherein the channels are substantially T-shaped such that a lubricant flowing through a channel reaches both flanks of the tooth of the drive pinion.

16. The wind turbine of claim 14, wherein the lubricant is grease, further comprising a second plate arranged on the other side of the drive pinion, opposite to the first plate, the second plate spanning at least the meshing engagement of the drive pinion with the gear such that a lubricant delivered by the channel can be retained by the second plate.

* * * * *